United States Patent [19]

McQuillan et al.

[11] Patent Number: 4,663,144
[45] Date of Patent: May 5, 1987

[54] WATER-SPLITTING CYCLE WITH GRAPHITE INTERCALATION COMPOUNDS

[75] Inventors: Barry W. McQuillan, San Diego; John H. Norman, La Jolla, both of Calif.

[73] Assignee: GA Technologies Inc., San Diego, Calif.

[21] Appl. No.: 801,578

[22] Filed: Nov. 25, 1985

[51] Int. Cl.[4] .................. C01B 3/02; C01B 13/18; C01B 31/04
[52] U.S. Cl. .................. 423/648 R; 423/579; 423/448; 252/503; 252/508
[58] Field of Search ............... 252/503, 508; 423/241, 423/414, 448, 648 R, 500, 579; 565/374

[56] References Cited

U.S. PATENT DOCUMENTS

| | | | |
|---|---|---|---|
| 3,409,563 | 11/1968 | Olstowski | 423/448 |
| 3,976,714 | 8/1976 | Rodewald | 585/374 |
| 3,984,352 | 10/1976 | Rodewald | 585/721 |
| 4,080,436 | 3/1978 | Fremery et al. | 423/579 |
| 4,089,938 | 5/1978 | Turner | 423/579 |
| 4,102,937 | 7/1978 | Harris | 585/372 |
| 4,271,045 | 6/1981 | Steigerwald et al. | 252/503 |

FOREIGN PATENT DOCUMENTS 2418020  10/1975  Fed. Rep. of Germany ...... 423/648

OTHER PUBLICATIONS

K. Leong and W. C. Forsman, "Electron Transfer to Protons in Graphite Intercalation," Synthetic Metals 6, 61-63 (1983).

Primary Examiner—John Doll
Assistant Examiner—Robert M. Kunemund
Attorney, Agent, or Firm—Fitch, Even, Tabin & Flannery

[57] ABSTRACT

Water is decomposed to molecular hydrogen and molecular oxygen in a thermochemical cycle which comprises (i) reacting $Cl_2$, $Br_2$ or $BrCl$ with water to obtain oxygen and hydrogen halide; (ii) forming a graphite intercalation compound with a hydrogen halide from step (i) and a metal halide selected from $MBr_iCl_{3-i}$, wherein M is aluminum, gallium or indium and i is 0, 1, 2 or 3, and thereby obtaining hydrogen; (iii) decomposing by heating the graphite intercalation compound formed in step (ii); (iv) recycling the halogen produced in step (iii) for use in step (i); and (v) recycling the metal halide and graphite produced in step (iv) for use in step (ii).

3 Claims, 1 Drawing Figure

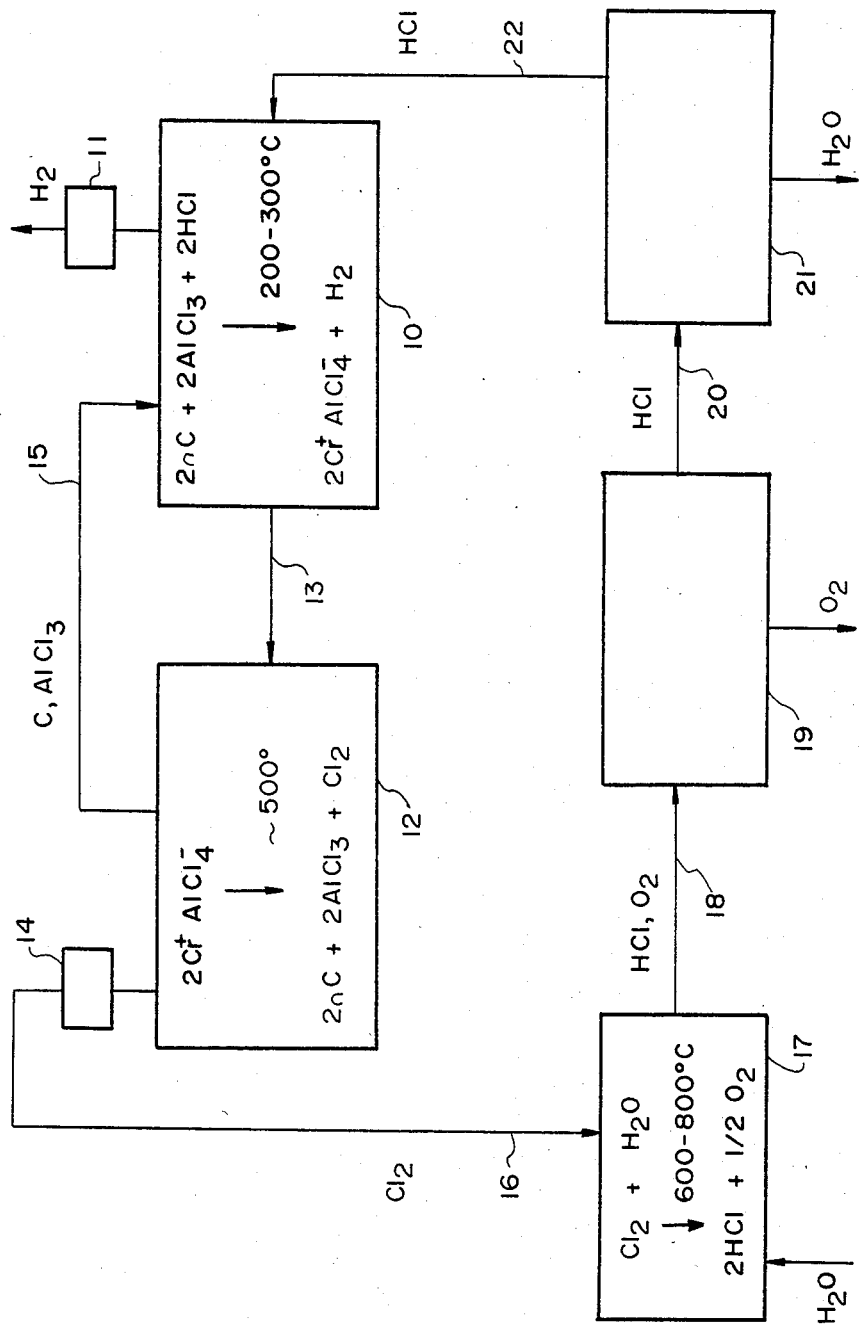

WATER-SPLITTING CYCLE WITH GRAPHITE INTERCALATION COMPOUNDS

TECHNICAL FIELD

The present invention concerns a process for splitting water into hydrogen and oxygen. More particularly, the invention concerns such processes which involve, in a thermochemical cycle, formation and decomposition of graphite intercalation compounds.

BACKGROUND OF THE INVENTION

There has long been interest in making hydrogen and oxygen from water, and numerous processes for doing so have been developed.

Recently, there has been interest in hydrogen as a medium for storage of energy and as an energy source. Thus, processes have been investigated whereby the heat supplied by power plants, by nuclear fission, nuclear fusion, or concentrated solar energy, can be utilized to split water and thereby produce hydrogen. At the same time, processes requiring hydrogen for making synthetic fuels and systems, such as fuel cells, using hydrogen to produce energy efficiently, have been developed. See Chemical and Engineering News, Nov. 21, 1977, pp. 27-28.

The oxygen obtained when water is split to make hydrogen is, like hydrogen, a valuable commodity with numerous industrial applications.

Among the known processes for splitting water are many which involve thermochemical cycles. See, e.g., U.S. Pat. Nos. 4,089,940; 4,089,939; 4,080,436 and 3,932,599.

The production of hydrogen in the formation of a graphite intercalation compound with $AlCl_3$ and $HCl$ has been reported. (Leong and Forsman, Synthetic Metals 6, 61-63 (1983)). While the thermal decomposition of the resulting intercalation compound is known, the products of the decomposition have heretofore been uncertain. In particular, thermal decomposition to graphite, $AlCl_3$ and $Cl_2$ has not been demonstrated.

The reverse Deacon process, whereby $Cl_2$ and $H_2O$ are reacted to make $HCl$ and $O_2$, has long been known and has been used in a number of water-splitting processes which involve thermochemical cycles. See Knoche et al., J. Hydrogen Energy 2, 269 (1977).

It has not been recognized heretofore, however, that formation and decomposition of a graphite intercalation compound involving a metal halide, together with production of oxygen and hydrogen halide by reaction of water with halogen, provide a thermochemical cycle for water-splitting.

SUMMARY OF THE INVENTION

We have discovered a class of thermochemical cycles for splitting water into hydrogen and oxygen which involve formation and decomposition of graphite intercalation compounds.

We have found that a graphite intercalation compound (GIC) is formed not only with $AlCl_3$ and $HCl$ but also with $AlCl_3$ and $HBr$, as well as $AlBr_3$, $GaCl_3$, $GaBr_3$, $InCl_3$ or $InBr_3$ and $HCl$ or $HBr$. In all of these cases, hydrogen is produced in formation of the GIC.

The GIC's formed with the trichlorides or tribromides of Al, Ga or In, and HCl or HBr, are decomposed on heating to graphite, metal trihalide and halogen.

In a "reverse Deacon reaction" or a "pseudo reverse Deacon reaction", the halogen produced by decomposition of the GIC is reacted with water to yield oxygen and hydrogen halide. In the present specification, "reverse Deacon reaction" means a reaction of halogen with water to yield oxygen and hydrogen halide in one step and "pseudo reverse Deacon reaction" means a sequence of two or more reactions the net effect of which is a reaction of halogen with water to yield oxygen and hydrogen halide.

Finally, to complete the cycle, the hydrogen halide from the reverse Deacon reaction or pseudo reverse Deacon reaction is employed to make GIC with the graphite and metal halide obtained by decomposition of GIC.

Of the class of water-splitting cycles we have discovered, one subclass of cycles, wherein a reverse Deacon reaction is employed, the halogen used in the reverse Deacon reaction is $Br_2$ or $Cl_2$ and the halogen of the metal halide is the same as that used in the reverse Deacon reaction, is illustrated in the following scheme:

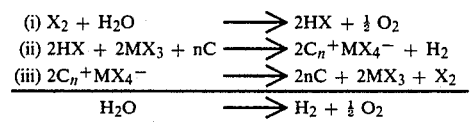

$$
\begin{array}{ll}
\text{(i) } X_2 + H_2O & \longrightarrow 2HX + \tfrac{1}{2} O_2 \\
\text{(ii) } 2HX + 2MX_3 + nC & \longrightarrow 2C_n^+ MX_4^- + H_2 \\
\text{(iii) } 2C_n^+ MX_4^- & \longrightarrow 2nC + 2MX_3 + X_2 \\
\hline
H_2O & \longrightarrow H_2 + \tfrac{1}{2} O_2
\end{array}
$$

wherein X is chlorine or bromine, M is aluminum, gallium or indium, "nC" represents graphite, "$C_n^+MX_4^-$" represents the graphite intercalation compound formed with HX and $MX_3$, and the halogen, the metal halide and the graphite are recycled through the process.

In this specification, we represent the GIC by the formula "$C_n^+MX_4^-$". It is noteworthy that, in the art, the GIC formed with HCl or $Cl_2$ and $AlCl_3$ is often represented as "$C_nAlCl_3$" and "$C_nAlCl_{3+x}$", even though excess $AlCl_3$ is usually employed in preparation of the GIC. A more accurate representation of the GIC made with HCl and excess $AlCl_3$ would be $C_n^+(AlCl_4^- \cdot mAlCl_3)$, where m is the number of moles of excess $AlCl_3$ per mole $AlCl_3$ which reacts to form GIC.

BRIEF DESCRIPTION OF THE DRAWING

The FIGURE shows a schematic representation of a preferred thermochemical cycle for water-splitting employing HCl and $AlCl_3$ to form a graphite intercalation compound with graphite powder.

DETAILED DESCRIPTION OF THE INVENTION

The present invention is a process for making $H_2$ and $O_2$ from $H_2O$ which comprises:

(i) reacting $Br_2$, $Cl_2$ or BrCl with water to obtain $O_2$ and the hydrogen halide or mixture of hydrogen halides corresponding to the halogen used in the reaction;

(ii) making a graphite intercalation compound with hydrogen halide obtained from the reaction of step (i) and a metal halide of formula $MBr_iCl_{3-i}$, wherein M is aluminum, gallium or indium and i is 0, 1, 2 or 3, to produce $H_2$;

(iii) decomposing by heating the graphite intercalation compound formed in step (ii) to produce halogen, metal halide and graphite; and (iv) recycling halogen produced in step (iii) for use in step (i) and recycling graphite and metal halide produced in step (iii) for use in step (ii).

The oxygen produced in step (i) and the hydrogen produced in step (ii) can be recovered for use in various industrial and energy-related applications, as discussed supra.

The process of the invention preferably employs $Cl_2$ as halogen, $AlCl_3$ as metal halide and finely divided, powdered graphite.

However, the process can be carried out also with $Br_2$ or BrCl or mixtures of any two or all three of $Br_2$, $Cl_2$ and BrCl. Similarly, any trihalide of aluminum, gallium or indium, wherein the halide is chloride, bromide or any combination of chloride and bromide, may be employed in making the graphite intercalation compound (GIC). Finally, any form of graphite which is capable of reacting to form a GIC with a metal halide of formula $MBr_iCl_{3-i}$ and HBr or HCl may be employed in the process.

The reverse Deacon reaction or pseudo reverse Deacon reaction (step (i) of the inventive process) is preferably carried out under conditions of temperature and pressure at which it provides production of oxygen and hydrogen halide at a practically useful rate. These conditions will vary, depending on whether a reverse Deacon reaction or pseudo reverse Deacon reaction is employed and on the halogen or mixture of halogens used in the reaction, but can be determined readily by reference to published thermodynamic data. See, e.g., Carty et al., Final Report to the Gas Research Institute: Thermochemical Hydrogen Production (Institute of Gas Technology, Chicago, Ill. 1981).

When $Cl_2$ is reacted directly with $H_2O$, a temperature in excess of about 330° C. will be acceptable. Above 600° C., the reaction proceeds favorably to yield $O_2$ and HCl. Alternatively, if a straightforward one-step reverse Deacon reaction is impractical, the pseudo reverse Deacon reaction, exemplified in the following paragraph with $Br_2$, can be applied with $Cl_2$.

When, instead of $Cl_2$ alone, $Br_2$ or BrCl is involved in producing oxygen and hydrogen halide from reaction with water, considerably higher temperatures and a pseudo reverse Deacon reaction will generally be required for production of oxygen and hydrogen halide to occur at an acceptable rate. For example, with $Br_2$, a Bunsen reaction, involving formation and decomposition of sulfuric acid, would advantageously be employed as the pseudo reverse Deacon reaction:

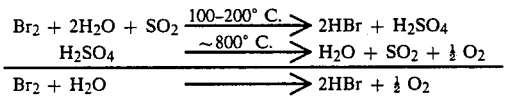

The reaction of halogen with water to yield oxygen and hydrogen halide can advantageously be carried out in a heating zone through which a continuously flowing stream of gases moves. The input stream into the zone will be a mixture of steam, halogen, possibly hydrogen halide contaminant with the halogen, and, if more than one reaction step is employed (in a pseudo reverse Deacon reaction), other reagents such as $SO_2$.

As indicated above, if the reverse Deacon reaction is the one-step, reverse Deacon process, wherein $Cl_2$ is reacted with $H_2O$, the temperature in the heating zone will exceed about 600° C. On the other hand, if the reverse Deacon reaction is a pseudo reverse Deacon reaction, such as the Bunsen reaction, the temperature in the heating zone will generally be substantially higher, such as about 800° C., if the Bunsen reaction with bromine is the reaction carried out in the zone.

The output stream from the heating zone will contain product from the reaction in the zone and some unreacted reagents.

If a Bunsen reaction is employed as the pseudo reverse Deacon reaction, any of the known processes in the art can be used to separate hydrogen halide, possibly contaminated with water and halogen, from sulfuric acid and sulfur dioxide, and then decompose the sulfuric acid to generate sulfur dioxide and water, for re-use in the Bunsen reaction, and oxygen.

If the preferred reverse Deacon process with chlorine and steam is employed as the reverse Deacon reaction, the temperature of the output stream from the heating zone will be reduced rapidly, to below about 300° C., to limit the significance of the back reaction (i.e., the Deacon process, wherein HCl reacts with $O_2$ to generate $H_2O$ and $Cl_2$).

The oxygen may be separated from the reverse Deacon reaction mixture by any of numerous techinques known in the art.

Similarly, the hydrogen halide may be isolated by any standard technique. It is preferred that the hydrogen halide be essentially free of $H_2O$ before being employed in the formation of GIC. Such pure hydrogen halide, with less than 0.01 percent $H_2O$, may be prepared by known separation techniques from the gases in the reverse, or pseudo reverse, Deacon reaction mixture. The hydrogen halide stream, essentially free of $H_2O$, will then flow to the reactor for step (ii) of the process, wherein GIC is made by reacting hydrogen halide with metal halide and graphite. The hydrogen halide stream entering the reactor for formation of GIC can be contaminated with halogen without impairing the process of the invention, other than by diminishing the efficiency of the cycle.

The above-described heating zone, and other neighboring areas of the reaction system wherein steam, halogen, hydrogen halide, oxygen and possibly other corrosive compounds are present together, will preferably be made of a material such as quartz, as many metal systems are badly corroded by such mixtures, particularly at the temperatures employed in the heating zone.

In step (ii) of the process the GIC is made by a suitable process known in the art for making a GIC with metal halide and hydrogen halide. See, e.g. Leong and Forsman, supra; Leong and Forsman, 15th Biennial Conf. on Carbon, 1981, p. 356.

The process of making a GIC is carried out in a reaction vessel constructed of material, such as stainless steel, that is unreactive with the hydrogen halide, halogen and metal halide being employed. The process is carried out preferably under conditions of temperature and pressure such that the metal halide is present as vapor or liquid in said reaction vessel. The hydrogen halide will be present at a pressure to drive the formation of GIC at a practically useful rate, and preferably at greater than 1 atmosphere to facilitate engineering of a continuous process. The formation of GIC is carried out at between about 200° C. and 300° C.

In one arrangement, powdered graphite will be held in a reaction vessel ("GIC vessel") maintained at a temperature around the boiling point or sublimation temperature of the metal halide, or mixture of metal halides, being used to make the GIC. The GIC vessel will be connected to other vessels in a way that permits reactants and products to flow between the vessels. One of these other vessels will be a "metal halide vessel", which will contain metal halide or a mixture of metal halides in solid or liquid form, preheated to a reaction temperature at which GIC will form in the presence of graphite and hydrogen halide. While this reaction temperature will vary, depending on the reactants involved, it will generally be between 200° C. and 300° C. Metal halide will then be transferred from the metal halide vessel to the GIC vessel and, with hydrogen halide present, react with the graphite in the GIC vessel to form the GIC and hydrogen gas. The graphite in the GIC vessel can optionally be agitated to increase the surface area of graphite in contact with metal halide and hydrogen halide gas.

The metal halide used to make GIC will be substantially free of water and reaction products of metal halide and water.

Hydrogen produced during formation of GIC is removed using standard techniques. In terms of the process just described, GIC formation proceeds until essentially all hydrogen halide in the GIC vessel has been consumed. Gas can then be transferred from the GIC vessel into another container, and the gas so obtained cooled to condense any metal halide. The remaining gas in the container will be hydrogen, possibly with traces of hydrogen halide. If necessary, the hydrogen gas can be further purified from hydrogen halide by any of numerous standard techniques known in the art.

The decomposition of GIC (step (iii)) is accomplished by heating. The temperature at which decomposition occurs will vary depending on the metal and halogen in the GIC, but will typically be between 500° C. and 800° C.

In one procedure, after hydrogen is removed from the GIC vessel, the vessel is isolated from the metal halide vessel and then heated to a temperature sufficient to decompose the GIC. As gas evolves during the decomposition, it passes through a condenser held below the boiling point or sublimation temperature of the metal halide, to remove metal halide from the stream, and the remaining gas (halogen possibly contaminated with hydrogen halide) flows to the heating zone where the reverse Deacon reaction is carried out, as described above. The heating of the GIC continues until GIC decomposition is complete.

Graphite and metal halide produced in the decomposition of GIC is returned to the GIC vessel and used again to make GIC in reaction with hydrogen halide.

Note that it is not necessary to separate the metal halide vessel from the GIC vessel, because both metal halide and graphite can be retained in the same vessel and cycled between being associated in a GIC and being separated, as hydrogen halide is introduced and GIC formed with production of hydrogen and then GIC decomposed with production of halogen. For example, the consumption of hydrogen halide to make hydrogen and halogen through the GIC intermediate can be carried out on a rotating bed basis, whereby a mixture of graphite and metal halide at 200°-300° C. is contacted with hydrogen halide to yield hydrogen as GIC is formed and the resulting mixture is then rotated to a higher temperature zone to decompose the GIC and yield halogen.

Steps (i), (ii) and (iii) of the process of the invention can be carried out on a continuous basis, rather than in simple isolated steps, by using, for example, standard counter-current techniques.

The energy to drive the process of the present invention is heat. The required heat energy can be provided from any source, which would include solar energy and nuclear energy. An especially preferred source of heat to drive the processes of the present invention is the heat which is available as a result of nuclear fission in a high temperature gas cooled reactor or the like.

The invention will now be illustrated with the following examples. All temperatures in the Example are in degrees Celsius. In the Examples, reference will be made to items in the FIGURE.

EXAMPLE I

This example relates to the most preferred process of the invention, wherein $Cl_2$ is employed as halogen, HCl as the hydrogen halide, and $AlCl_3$ as the metal halide, and wherein a reverse Deacon reaction is used to make oxygen and HCl from water and $Cl_2$.

(A) In reactor 10, graphite powder is mixed with molten $AlCl_3$ at 200°-300°, while dry HCl gas is bubbled through the mixture. The $H_2$ gas, possibly with impurity HCl, that is evolved as GIC forms is passed through a condenser 11 to separate the $H_2$ and HCl from metal halide. The condensed metal halide is returned to reactor 10 for re-use in making GIC.

(B) The resulting molten mass of $C_n^+AlCl_4^-$ and $AlCl_3$ is heated to 475° to 525° and $Cl_2$ gas, possibly contaminated with HCl and $AlCl_3$, is evolved. To accomplish the decomposition, the molten mass is either transferred to a different reactor 12, through a conduit 13, for heating in reactor 12, or reactor 10 itself is heated, optionally after being moved or rotated to a zone with the desired temperature. The evolved gas is passed through a condenser 14 to separate the $Cl_2$ (and HCl contaminant) from any accompanying $AlCl_3$. The condensed $AlCl_3$ is returned to the graphite/$AlCl_3$ mass for reuse in step A. If decomposition of $C_n^+AlCl_4^-$ is accomplished in a reactor separate from reactor 10, the $AlCl_3$, along with graphite, is returned to reactor 10 through a conduit 15, which can be the same conduit as conduit 13, but more preferably would be separate from 13 to permit continuous cycling of graphite and $AlCl_3$ between being separated and being associated in a GIC.

(C) The chlorine, with any HCl impurity, flows through conduit 16 to heating zone 17, where the reverse Deacon process is effected by introducing steam and heating to 600°-800° C. Heating zone 17, as well as the end portions, of conduits 16 and 18 adjacent to the heating zone, which might be contacted with $Cl_2$, $H_2O$, HCl and $O_2$ mixtures at above about 400° C., are desirably constructed of a material such as quartz; metal systems that are badly corroded by the mixture of steam, $Cl_2$, HCl and $O_2$ heated to 600° C. are avoided. Residence time in heating zone 17 is controlled by the flow rates of steam, chlorine and product stream in order to maximize the yield of $O_2$.

(D) The product stream from heating zone 17 includes HCl and $O_2$, as well as some $Cl_2$ and $H_2O$ as contaminants. The product stream is cooled rapidly, to below about 300° C., as it leaves the heating zone in order to limit the significance of the back (i.e., Deacon) reaction. The product stream flows through conduit 18 to reactor or processor 19, where $O_2$ is separated from the stream by a process known in the art, such as washing the stream with liquid water, optionally with pressurization.

(E) After separation of $O_2$, the product stream flows through conduit 20 to reactor or processor 21, where the stream is treated to remove water, in order to avoid the reaction between water and AlCl$_3$ in reactor 10 or 12. The removal of water, which, as known in the art, forms an azeotrope with HCl, can advantageously be accomplished by a high pressure distillation at reactor 21. From 21, the HCl, with possibly some Cl$_2$ contaminant, flows through conduit 22 to reactor 10 to participate in formation of GIC.

EXAMPLE II

Water splitting cycles are carried out in the same way as the cycle described in Example I, except that, in one cycle, GaCl$_3$ is used in place of AlCl$_3$ and, in another cycle, InCl$_3$ is used in place of AlCl$_3$.

EXAMPLE III

A water splitting cycle is carried out with Br$_2$ and AlBr$_3$. The cycle is carried out in the same way as the cycle described in Example I except that a pseudo reverse Deacon reaction is accomplished as follows, employing the well known Bunsen reaction: Br$_2$ from decomposition of GIC is combined in a reactor with steam and sulfur dioxide and the mixture is heated to 100° to 200° to yield hydrogen bromide and sulfuric acid. The hydrogen bromide is separated from water and sulfuric acid by methods known in the art and cycled back to form GIC with graphite and molten AlBr$_3$. The sulfuric acid is then decomposed by heating to about 800° in a process known in the art to produce oxygen and regenerate sulfur dioxide and water. Using known methods, the oxygen is separated from the mixture and the water and sulfur dioxide are cycled back for reuse in the Bunsen reaction.

While the invention has been described above with reference to certain embodiments, it will be understood by persons of skill that various modifications and variations can be made without departing from the spirit and scope of the invention. These modifications and variations are part of the invention described and claimed herein.

What is claimed is:

1. A process for making H$_2$ and O$_2$ from H$_2$O in a thermochemical cycle which comprises:
   (i) reacting Br$_2$, Cl$_2$ or BrCl with water under conditions which produce O$_2$ and hydrogen halide;
   (ii) making a graphite intercalation compound with a hydrogen halide obtained from the reacton of step (i) and a metal halide of formula MBr$_i$Cl$_{3-i}$, wherein M is aluminum, gallium or indium and i is 0, 1, 2 or 3, under conditions which produce H$_2$;
   (iii) decomposing the graphite intercalation compound formed in step (ii) by heating to produce halogen, metal halide and graphite;
   (iv) recycling for use in step (i) said halogen produced in step (iii); and
   (v) recycling for use in step (ii) said graphite and said metal halide produced in step (iii).

2. A process according to claim 1 wherein the reaction of step (i) is a reverse Deacon reaction of Cl$_2$ with H$_2$O and wherein the metal halide used in formation of the graphite intercalation compound in step (ii) is selected from AlCl$_3$, GaCl$_3$, and InCl$_3$.

3. A process according to claim 2 wherein the metal halide is AlCl$_3$.

* * * * *

UNITED STATES PATENT AND TRADEMARK OFFICE
CERTIFICATE OF CORRECTION

PATENT NO. : 4,663,144
DATED : May 5, 1987
INVENTOR(S) : McQuillan and Norman

It is certified that error appears in the above-identified patent and that said Letters Patent is hereby corrected as shown below:

In the FIGURE, in both the box representing reactor 10 and the box representing reactor 12, $2Cr^+AlCl_4^+$ should be $2C_n^+AlCl_4^-$.

Signed and Sealed this

Eighth Day of September, 1987

*Attest:*

DONALD J. QUIGG

*Attesting Officer*  *Commissioner of Patents and Trademarks*